3,109,041
POLYMERIZATION OF ISOBUTYLENE
Edward T. Child, William L. Lafferty, Jr., and Alfred J. Millendorf, Fishkill, N.Y., and Louis B. Bos, Cranbury, N.J., assignors to Texaco Inc., New York, N.Y., a corporation of Delaware
Filed Feb. 16, 1961, Ser. No. 89,829
12 Claims. (Cl. 260—683.15)

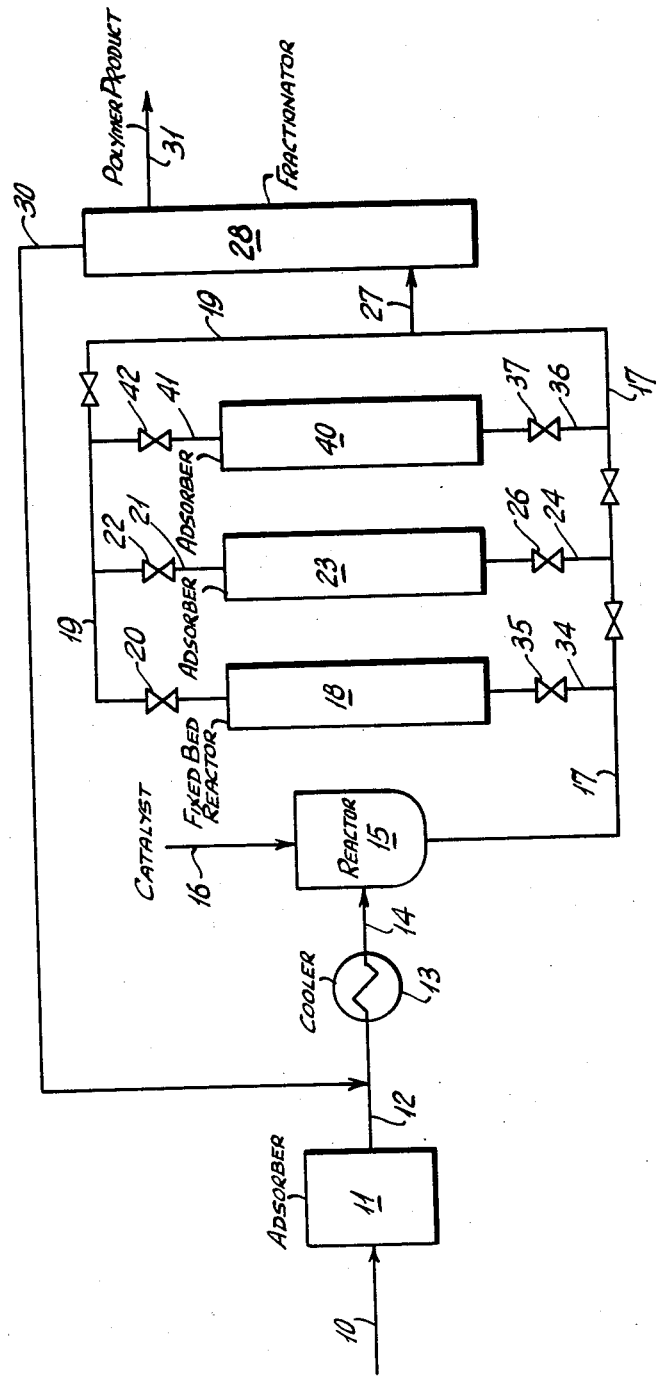

This invention relates to the polymerization of olefins and, in particular, to a method for polymerizing isobutylene in the presence of a Friedel-Crafts catalyst.

The catalytic conversion of mono-olefins to polymers in a moderate to high molecular weight range is well known. Generally, a charge stock comprising a mono-olefin admixed with a hydrocarbon carrier, such as a paraffin, is contacted with a polymerization catalyst under effective polymerization temperatures to produce the desired polymer. Catalysts which are effective for polymerization are the active metal halides or Friedel-Crafts catalysts. While acceptable conversions of monomers are possible by the known methods, they often require long reaction periods to attain commercially practical conversions and are not as economical as desirable.

In accordance with this invention, isobutylene is polymerized in a staged process to effect substantially complete conversion of the isobutylene monomer to isobutylene polymers having average molecular weights in the range of 300 to 10,000 or above. This reaction is conducted in two steps or stages with about 40 to 95% of the isobutylene monomer being converted in a first reaction zone while the balance of the isobutylene monomer present in the reaction product from the first step is substantially completely converted in a second stage reaction. While both the initial and the final reactions are effected with a catalyst, the first stage uses the catalyst alone while the second stage employs a fixed-bed reactor with the catalyst comprising a Friedel-Crafts halide on a support.

An important aspect of the present invention is the provision of a method whereby substantially complete conversion of the olefin to a polymer is effectively and economically carried out. A surprising advantage is that high yields are often realized in less time by the two-stage process than by a single stage reaction. Moreover, a higher degree of catalyst utilization is obtained due to the use of a supported catalyst in the second stage of the reaction.

Both steps of the instant process are conducted in the presence of a Friedel-Crafts catalyst. The effective Friedel-Crafts halides for this two-stage process are those which are soluble in either the diluent, reactants or reaction products of the first reaction zone or which because of their chemical or physical properties can be carried through the two steps of the process and adsorbed on the adsorbent employed after the second stage reaction. Particularly effective Friedel-Crafts halides include, aluminum, trichloride, boron trifluoride and titanium tetrachloride.

The feed stream for this process comprises isobutylene monomer in admixture with a solvent. The solvent is generally a hydrocarbon or mixture of hydrocarbons, such as $C_3$ to $C_8$ saturated hydrocarbons, that is inert under polymerization conditions. A commonly employed feed for this process is a butane-butene stream containing isobutylene together with 1-butene and 2-butene and other $C_3$ to $C_5$ hydrocarbons. This process is effective with isobutylene to solvent proportions in the range of 1:9 to 2:1 on a weight basis. A particularly effective feed stream is one in which approximately equal weight of isobutylene and paraffin solvent are employed.

In the first stage of this process, polymerization of about 40 to 95% of the isobutylene monomer is effected under the usual conditions of temperature and pressure in a conventional reactor in the presence of the selected Friedel-Crafts catalyst. It is preferred to effect the polymerization of 80 to 95% of the isobutylene monomer in the first stage.

The catalyst is introduced into the reactor in admixture with an inert hydrocarbon which may be of the same composition as that employed as the solvent or diluent for the feed in order to simplify the separation procedure during the recovery of the polymer. The proportion of catalyst to feed employed in the first stage ranges from 0.01 to 20% by weight of the catalyst based on the total weight of the feed. Preferred catalyst proportions are 0.01 to 2% for boron trifluoride, 0.5 to 2% for titanium tetrachloride and 10 to 20% for aluminum trichloride. The catalyst is usually dissolved or suspended in a diluent for use in this process. Up to 2.5 weight percent of boron trifluoride can be dissolved in a hydrocarbon and at the other extreme up to 20 weight percent of aluminum trichloride suspended in a hydrocarbon. Contact of the catalyst with isobutylene initiates the reaction.

After 40–95% of the isobutylene monomer has been polymerized in the first stage to produce a reaction product comprising polyisobutylene and unreacted isobutylene, the reaction product is passed through a fixed-bed reactor to polymerize the balance of the unreacted isobutylene. The polymerization catalyst in this reactor comprises a Friedel-Crafts halide on an adsorbent supporting material. Adsorbent materials which are employed to form the supported catalyst are activated carbon, silica, alumina and mixtures thereof. Substantially complete polymerization of the unreacted isobutylene is effected in this reactor under conventional polymerization conditions as the effluent is passed through the supported catalyst.

The reaction product or effluent from the second-stage reaction comprises essentially polyisobutylene and the hydrocarbon solvent. This effluent, however, also contains minor amounts of the catalyst which is entrained or dissolved in the reaction product. The catalyst in the reaction product is detrimental to the stability of the polyisobutylene product and must be removed if a satisfactory product is to be produced. The effluent is, therefore, passed over a suitable adsorbent material to adsorb the catalyst from the stream containing the polyisobutylene product. The catalyst-free product stream is then passed into a fractionator where the hydrocarbon diluent is separated from the polyisobutylene polymer.

An important feature of this invention leading to economy of operation is the discovery that the adsorbent material on losing its effectiveness as an adsorbent develops the function of a catalyst, more specifically a supported catalyst, useful in the second stage of the instant process. This is particularly fortuitous since the supported catalyst initially employed in the second stage reaction loses its effectiveness and must be regenerated or replaced.

As alluded to above, the second stage containing the fixed-bed supported catalyst over extended operations is rendered progressively ineffective due to the deposition of reaction products including polyisobutylene polymer on the catalyst and by the formation of catalytically inactive catalyst complexes. While the supported catalyst is losing its effectiveness, a first zone of adsorbent material following the second stage reaction gradually adsorbs or becomes loaded with catalyst until it exhibits reduced effectiveness to adsorb further quantities of the catalyst. However, the deposition of catalyst on this adsorbent material converts the adsorbent material to a substance supporting a Friedel-Crafts halide having catalytic activity and which may be effectively employed as the supported catalyst in the second stage reactor of this process. As this condition materializes, the fixed-bed, second stage reactor is taken off-stream and the reaction products from the first stage reaction are passed under polymerization conditions into the adsorbent material now effective for polymerization. The effluent from this is passed through a second zone of adsorbent material which has been provided and which is effective to remove the catalyst remaining in the completely polymerized reaction product.

Boron trifluoride is particularly effective as a catalyst in both stages of this process, i.e. effective by itself and in a supported catalyst comprising boron trifluoride on an adsorbent support. In addition, the boron trifluoride entrained in the reaction product or effluent from the second stage reaction is adsorbed on fresh adsorbent so that this adsorbent gradually becomes catalytically effective and can be used in the second stage reaction when the initial catalyst charge in that step has become exhausted.

The catalyst compositions comprising boron trifluoride on a support is a novel catalyst composition. This catalyst will generally consist of 2 to 20% by weight of boron trifluoride with the balance or 80 to 98% consisting of the support material. It is preferred to employ a catalyst in which the boron trifluoride amounts to 2 to 10% by weight and in which the support material is silica gel. A similar composition comprising titanium tetrachloride is another novel catalyst composition that is highly effective in this process. Both of these catalyst compositions are the subject of a commonly assigned copending application filed of even date.

The materials noted above, namely activated carbon, silica, alumina and mixtures thereof which may be employed as supports or carriers in the supported Friedel-Crafts halide catalyst composition are also suitable as the adsorbent material following the second stage of this process. The properties of these adsorbent materials are largely responsible for the economical operation provided by this process. Silica gel is particularly preferred as the adsorbent and support material.

The operation of a particular modification of this invention is illustrated below in connection with the accompanying drawing.

An isobutylene-containing charge stock from any suitable source is charged through pipe 10 into adsorber unit 11. The adsorber unit is filled with an adsorbing medium effective for removing water or moisture and other undesirable components in the isobutylene feed. Silica gel has been found most effective for this purpose although other well known adsorbing mediums may also be employed. The dehydrated and purified isobutylene stream is passed through line 12 into heat exchanger 13 where it is adjusted to the temperature range at which the polymerization reaction is to be conducted depending on the catalyst being employed. Generally, the feed is cooled although polymerization may be effected at temperatures in the range of −100° C. to about 150° C. The dehydrated isobutylene feed is passed through line 14 into reactor 15. The polymerization catalyst, a mixture of a Friedel-Crafts halide in an inert hydrocarbon solvent, such as pentane, butane or the like, is added to the reactor through line 16.

Any conventional reactor may be employed in the first stage reaction of this process. A reaction vessel or tank having a mechanical mixing means or a stirrer is preferred. However, a tubular reactor in which polymerization takes place as the feed stream and catalyst are passed through the tube is also suitable. Bath basic types of reactors, those designed for back-mixing of the reaction product and those preventing back-mixing may be employed in the first stage of the process.

Polymerization in the reactor is effected at a temperature in the range of −100° to 150° C. under a pressure in the range from about atmospheric to 500 pounds per square inch. Under the preferred operating conditions, isobutylene is converted to polyisobutylene in the amount of 90 to 95% generally after a residence time from about ½ to 3 hours.

The product from the reactor containing the diluent, unreacted isobutylene and between 90 and 95% of the original isobutylene feed as a polyisobutylene polymer is passed through line 17 and line 34 into fixed-bed reactor 18. This reactor is preferably a tower containing a fixed-bed of a supported catalyst. The catalyst employed in this stage is a Friedel-Crafts halide on a support material. This catalyst can be a freshly prepared lot of active metal halide on support material or, more preferably, may be formed by the adsorption of the metal halide remaining in the polymer effluent in an adsorption step as explained hereinbelow.

Polymerization of substantially all of the isobutylene monomer present in the effluent from the first stage reaction is accomplished in the fixed-bed reactor on contact with the supported Friedel-Crafts catalyst at a temperature in the range of −100° C. to 150° C. The residence time in this reactor is of short duration generally in the order of about 10 to 30 minutes. The reaction product from the fixed-bed reactor comprises the polyisobutylene polymer, the hydrocarbon solvent and a minor amount of entrained and/or dissolved Friedel-Crafts halide.

The reaction product from the fixed-bed reactor is passed through lines 19 and 21 into adsorber unit 23. This unit is desirably in the form of a tower and contains an adsorbent effective to remove the catalyst from the reaction product. The reaction product is contacted with adsorbent and the purified solution of polymer and hydrocarbon is passed through lines 45, 17 and 27 into fractionating column 28. In the fractionator, the solvent is separated and taken off through line 30 while the polymer product is recovered through line 31. The hydrocarbon solvent is recycled through line 30 and is re-employed by combining same with isobutylene feed upstream from the stirred reactor, preferably before the feed enters the heat exchanger.

When the process is started up, tower 40 is a standby adsorption unit filled with adsorbent material. This unit provides the flexibility for continuously processing the incompletely polymerized isobutylene from the first stage reactor after the catalyst in the second stage fixed-bed reactor has lost its effectiveness.

As noted above, the second stage reactor having a supported catalyst becomes ineffective over extended use due to the build-up of polymer and the formation of non-active catalyst complexes. At the same time the adsorbent in adsorber unit 23 is adsorbing catalyst and as the catalyst builds up it is converted into a unit exhibiting substantial catalytic activity for polymerizing isobutylene monomer. At this point, it is feasible to stop the flow of the reaction product from the first stage of the process to fixed-bed reactor 18 and to divert this reaction product to unit 23 which functions as a fixed-bed reactor. The isobutylene monomer remaining in the diverted stream is substantially completely polymerized to polyisobutylene polymer in unit 23 and the reaction product is passed through line 21, 19 and 41 into adsorber unit 40 which contains an adsorbent effective for removing any catalyst remaining in the reaction product effluent. The catalyst-free reaction product from tower 40 is passed through lines 36, 17 and 27 into fractionator 28 wherein the polyisobutylene polymer is separated and recovered while the hydrocarbon solvent is recycled.

The following examples illustrate the practice of this invention.

*Example I*

A partially purified butane-butene stream containing 15% of isobutylene was polymerized by passing the butane-butene stream through a coil reactor with 1% by weight of titanium tetrachloride at 80° F. After a residence time in the coil of 60 minutes, the stream was passed through a second stage, fixed-bed of silica gel which gradually adsorbed titanium tetrachloride and further polymerized the butane-butene stream. A 78% yield of polyisobutylene having an average molecular weight of 680 was realized.

When the same reaction was conducted using a coil reactor alone without the second stage or supported catalyst, fixed-bed reactor, a 40% yield of polyisobutylene was realized having about the same average molecular weight obtained above.

*Example II*

A feed stream consisting of 55 weight percent isobutylene dissolved in 45 weight percent of pentane (including the solvent from the catalyst feed) was polymerized by passing the stream continuously into a stirred reactor with 0.06 weight percent boron trifluoride basis total charge at 10° F. After an average residence time in the reactor of 70 minutes, the stream passed htrough a second stage, fixed-bed silica gel which gradually adsorbed boron trifluoride and further polymerized the unreacted isobutylene. A 79% yield of polyisobutylene was achieved in the primary reactor and after the secondary reactor above 99% of the isobutylene had been converted to polymer. The effluent from the silica gel bed contained less than 5 parts per million of boron and the polymer recovered after stripping had an average molecular weight of 636.

We claim:

1. A method for producing polyisobutylene which comprises reacting isobutylene in admixture with an inert solvent under polymerization conditions and in contact with a Friedel-Crafts catalyst in the absence of a support until at least 40 to 95% of said isobutylene has reacted to form a reaction product comprising polyisobutylene, solvent and unreacted isobutylene, and further reacting said reaction product under polymerization conditions by contacting said product in a fixed-bed reactor with a supported Friedel-Crafts catalyst to produce a polyisobutylene product.

2. A method according to claim 1 in which said polyisobutylene product is further contacted with an adsorbent material to adsorb entrained catalyst and produce a substantially catalyst-free polyisobutylene product.

3. A continuous method for producing polyisobutylene which comprises reacting isobutylene in admixture with an inert solvent under polymerization conditions and in contact with a Friedel-Crafts catalyst in the absence of a support until at least 40 to 95% of said isobutylene has reacted to form a reaction product comprising polyisobutylene, solvent and unreacted isobutylene, further reacting said reaction product under polymerization conditions by contacting said product in a fixed-bed reactor with a supported Friedel-Crafts catalyst to produce an effluent containing a polyisobutylene product, contacting the effluent containing said polyisobutylene product with a first zone of adsorbent material to adsorb entrained catalyst and produce a substantially catalyst-free polyisobutylene, continuing the foregoing steps until the effectiveness of said supported Friedel-Crafts catalyst is reduced and said adsorbent material becomes loaded with entrained catalyst and is no longer effective for adsorbing same, by-passing said supported Friedel-Crafts catalyst and passing said reaction product under polymerization conditions into contact with said first zone of adsorbent material now loaded with a Friedel-Crafts catalyst and catalytically effective for polymerization to effect substantially complete conversion of said isobutylene in said reaction product to produce an effluent similar to that produced by said fixed-bed reactor containing a polyisobutylene product, and contacting said effluent containing said polyisobutylene product with a second zone of adsorbent material to adsorb entrained catalyst and produce a substantially catalyst-free polyisobutylene.

4. A process according to claim 3 in which said catalyst support material and said adsorbent material are selected from the class consisting of activated carbon, silica, alumina, and mixtures thereof.

5. A process according to claim 3 in which said catalyst support material and said adsorbent material are silica gel.

6. A process according to claim 3 in which said polyisobutylene has an average molecular weight in the range of 300 to 10,000.

7. A process according to claim 3 in which said Friedel-Crafts catalyst is selected from the group consisting of boron trifluoride, aluminum trichloride and titanium tetrachloride.

8. A process according to claim 3 in which said Friedel-Crafts catalyst is boron trifluoride.

9. A continuous method for producing polyisobutylene which comprises reacting isobutylene in admixture with an inert solvent under polymerization conditions and in contact with boron trifluoride in the absence of a support until at least 40 to 95% of said isobutylene has reacted to form a reaction product comprising polyisobutylene, solvent and unreacted isobutylene, further reacting said reaction product under polymerization conditions by contacting said product in a fixed-bed reactor with a catalyst comprising boron trifluoride on silica gel to produce an effluent containing a polyisobutylene product, contacting the effluent containing said polyisobutylene product with a first zone of silica gel to adsorb entrained catalyst and produce a substantially catalyst-free polyisobutylene, continuing the foregoing steps until the effectiveness of said boron trifluoride-silica gel catalyst is reduced and said silica gel becomes loaded with entrained catalyst and is no longer effective for adsorbing same, by-passing said boron trifluoride-silica gel catalyst and passing said reaction product under polymerization conditions into contact with said first zone of silica gel now loaded with boron trifluoride and catalytically effective for polymerization to effect substantially complete conversion of said isobutylene in said reaction product similar to the reaction in said fixed-bed reactor to produce an effluent containing a polyisobutylene product, and contacting said effluent containing said polyisobutylene product with a second zone of silica gel to adsorb entrained catalyst and produce a substantially boron trifluoride-free polyisobutylene.

10. A method according to claim 9 in which said inert solvent is a saturated hydrocarbon having from 3 to 8 carbon atoms.

11. A method according to claim 9 in which said polyisobutylene has an average molecular weight in the range of 300 to 10,000.

12. A method according to claim 9 in which said polymerization of isobutylene in contact with boron trifluoride and in the absence of a support is effected until at least 80 to 95% of said isobutylene is reacted.

References Cited in the file of this patent

UNITED STATES PATENTS

| 2,040,658 | Kuentzel et al. | May 12, 1936 |
| 2,329,714 | Grassholf | Sept. 21, 1943 |
| 2,349,053 | Pevere | May 16, 1944 |